United States Patent
Stewart et al.

(10) Patent No.: US 9,807,499 B2
(45) Date of Patent: Oct. 31, 2017

(54) SYSTEMS AND METHODS TO IDENTIFY DEVICE WITH WHICH TO PARTICIPATE IN COMMUNICATION OF AUDIO DATA

(71) Applicant: LENOVO (SINGAPORE) PTE. LTD., New Tech Park (SG)

(72) Inventors: Aaron Michael Stewart, Raleigh, NC (US); Jeffrey E. Skinner, Raleigh, NC (US); Jonathan Jen-Wei Yu, Raleigh, NC (US); Lincoln Penn Hancock, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 15/084,798

(22) Filed: Mar. 30, 2016

(65) Prior Publication Data

US 2017/0289676 A1    Oct. 5, 2017

(51) Int. Cl.
  *H04R 3/00*   (2006.01)
(52) U.S. Cl.
  CPC .......... *H04R 3/00* (2013.01); *H04R 2420/01* (2013.01)
(58) Field of Classification Search
  CPC .............................. H04R 3/00; H04R 2420/01
  See application file for complete search history.

(56) References Cited

U.S. PATENT DOCUMENTS

| | | | | |
|---|---|---|---|---|
| 8,068,925 B2* | 11/2011 | McKillop | ............... | G06F 3/165 381/77 |
| 8,243,949 B2* | 8/2012 | Bhow | ............... | H04N 21/25891 381/77 |
| 2015/0189425 A1* | 7/2015 | Pang | ................... | H04M 1/6041 381/77 |
| 2015/0189426 A1* | 7/2015 | Pang | ....................... | H04M 1/21 381/77 |
| 2015/0189435 A1* | 7/2015 | Sako | ..................... | H04R 3/005 381/92 |
| 2015/0195051 A1* | 7/2015 | Hutchings | ............. | G01S 5/0257 455/41.3 |
| 2015/0195683 A1* | 7/2015 | Hutchings | ............. | G01S 5/0257 455/456.1 |
| 2015/0208191 A1* | 7/2015 | Sako | ..................... | H04R 1/403 381/303 |
| 2015/0382147 A1* | 12/2015 | Clark | ................ | H04M 1/72569 455/414.1 |
| 2016/0253146 A1* | 9/2016 | Yang | ....................... | H04N 5/60 381/107 |
| 2016/0300468 A1* | 10/2016 | Stricker | ................ | G08B 21/02 |

* cited by examiner

*Primary Examiner* — Brenda Bernardi
(74) *Attorney, Agent, or Firm* — John L. Rogitz; John M. Rogitz (57) ABSTRACT

In one aspect, a first device includes a processor and storage accessible to the processor. The storage bears instructions executable by the processor to receive information pertaining to a location of a user and, based at least in part on the information, determine an apparatus to actuate from among plural apparatuses to participate in communication concerning audio data. The instructions are also executable to, based at least in part on the determination, participate in communication with the apparatus concerning audio data.

20 Claims, 6 Drawing Sheets

SYSTEMS AND METHODS TO IDENTIFY DEVICE WITH WHICH TO PARTICIPATE IN COMMUNICATION OF AUDIO DATA

FIELD

The present application relates generally to systems and methods to identify a device with which to participate in communication of audio data.

BACKGROUND

As recognized herein, a personal assistant application executing at a listening device can process audible input received by the listening device and provide useful output in response, such as an answer to a question posed by a user. However, as also recognized herein, one often should be relatively close to the listening device to provide audible input that is detectable by the listening device, and this is simply not convenient in many situations.

SUMMARY

Accordingly, in one aspect a first device includes a processor and storage accessible to the processor. The storage bears instructions executable by the processor to receive information pertaining to a location of a user and, based at least in part on the information, determine an apparatus to actuate from among plural apparatuses to participate in communication concerning audio data. The instructions are also executable to, based at least in part on the determination, participate in communication with the apparatus concerning audio data.

In another aspect, a method includes receiving information at a device pertaining to a location of a user and determining, based at least in part on the information, an apparatus to actuate from among plural apparatuses to participate in communication with using the device and concerning audio data. The method also includes using, based at least in part on the determination, the device to participate in communication with the apparatus concerning audio data.

In still another aspect, a computer readable storage medium that is not a transitory signal comprises instructions executable by a processor to receive first data pertaining to a location of a user and, based on the first data, identify a device at which to present audio. The instructions are also executable to provide audio data to the device based on the identification of the device.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein an include various sub-routines, procedures, etc. It is to be understood that logic divulged as being executed by, e.g., a module can be redistributed to other software modules and/or combine together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
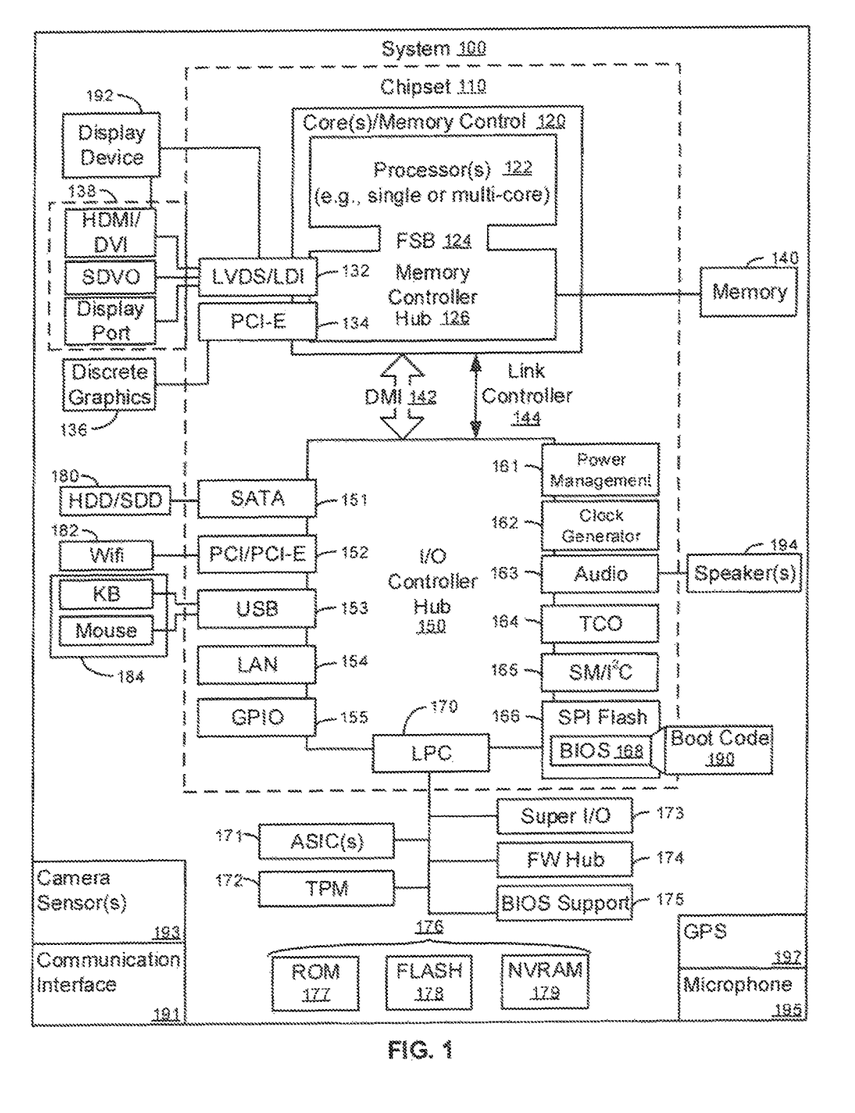
FIG. 1 is a block diagram of an example system in accordance with present principles.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation™, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As show in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support tor DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g. tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

FIG. 1 also shows that the system 100 may include at least one additional communication interface such as a local area connection (LAN) interface 191. The LAN interface 191 may be a wired and/or wireless LAN interface, where examples of wireless LAN interfaces that may establish the LAN interface 191 include a Wi-Fi transceiver for communicating with other devices in accordance with present principles using Wi-Fi communication protocols, a Bluetooth and/or Bluetooth low energy (BLE) communication element (e.g., a Bluetooth 4.0 communication element) for communicating with other devices in accordance with present principles using Bluetooth communication protocols, and/or a near field communication (NFC) element for communicating using with other devices in accordance with present principles using NFC protocols. However, note that still other communication interfaces may be used for communication with other devices and apparatuses in accordance with present principles. For instance, micro-USB 3.0 communication interfaces may be used.

Still further, the system 100 may include one or more cameras or other presence sensors 193 that provide input (such as images) to the processor 122. Other types of presence sensors may include a proximity sensor or another type of optical sensor other than a camera such as an infrared (IR) optical sensor. If the sensor(s) 193 include a camera, it may be a thermal imaging camera, a digital camera such as a webcam, a three-dimensional (3D) camera, and/or a camera otherwise integrated into the system 100 and controllable by the processor 122 to gather pictures/images and/or video.

The system may also include at least one audio receiver/microphone 195 that provides input to the processor 122 based on audio that is detected at the microphone 195, such as via a user providing audible input to the microphone 195. Even further, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

Additionally, though now shown for clarity, in some embodiments the system 100 may include a gyroscope that senses and/or measures the orientation of the system 100 and provides input related thereto to the processor 122, and an accelerometer that senses acceleration and/or movement of the system 100 and provides input related thereto to the processor 122.

It is to be understood that an example client device or other machine computer may include fewer or more features than shown on the system 100 of FIG. 1. In any case, it is to be understood at least based on the foregoing that the system 100 is configured to undertake present principles.

Figure 2:
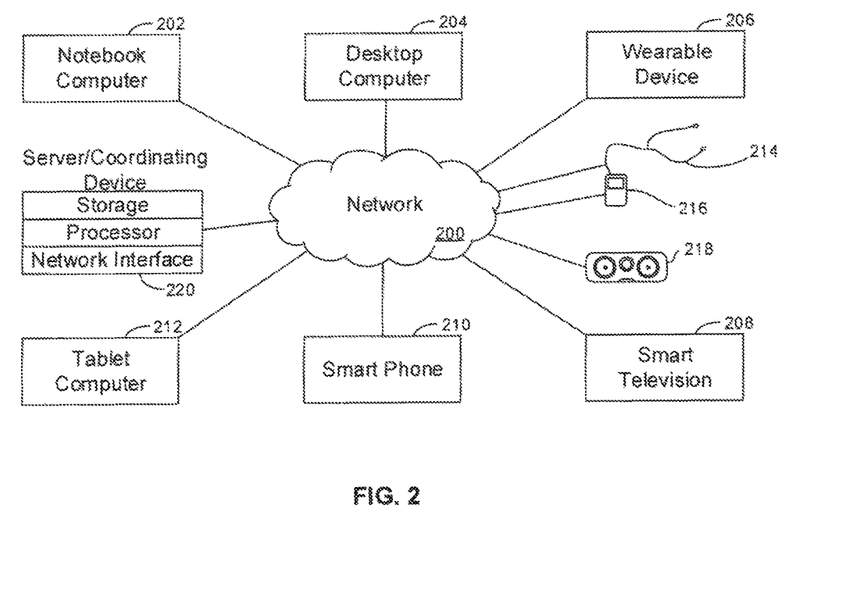
FIG. 2 is a block diagram of an example network of devices in accordance with present principles.

Turning now to FIG. 2, example devices are shown communicating over a network 200 such as a local area network (LAN), a Wi-Fi network, a Bluetooth (e.g., peer-to-peer) network, and/or the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a set of headphones or ear buds 214, an audio player 216 that may be connected to the headphones 214, and an Internet-enabled computerized speaker 218 such as a Bluetooth speaker. FIG. 2 also shows a server and/or coordinating device 220 for managing devices connected via the network 200, such as by sending data to and receiving data from the devices, providing commands to the devices, etc. Thus, it is to be understood that the devices 202-220 are configured to communicate with each other over the network 200 to undertake present principles.

Figure 3:
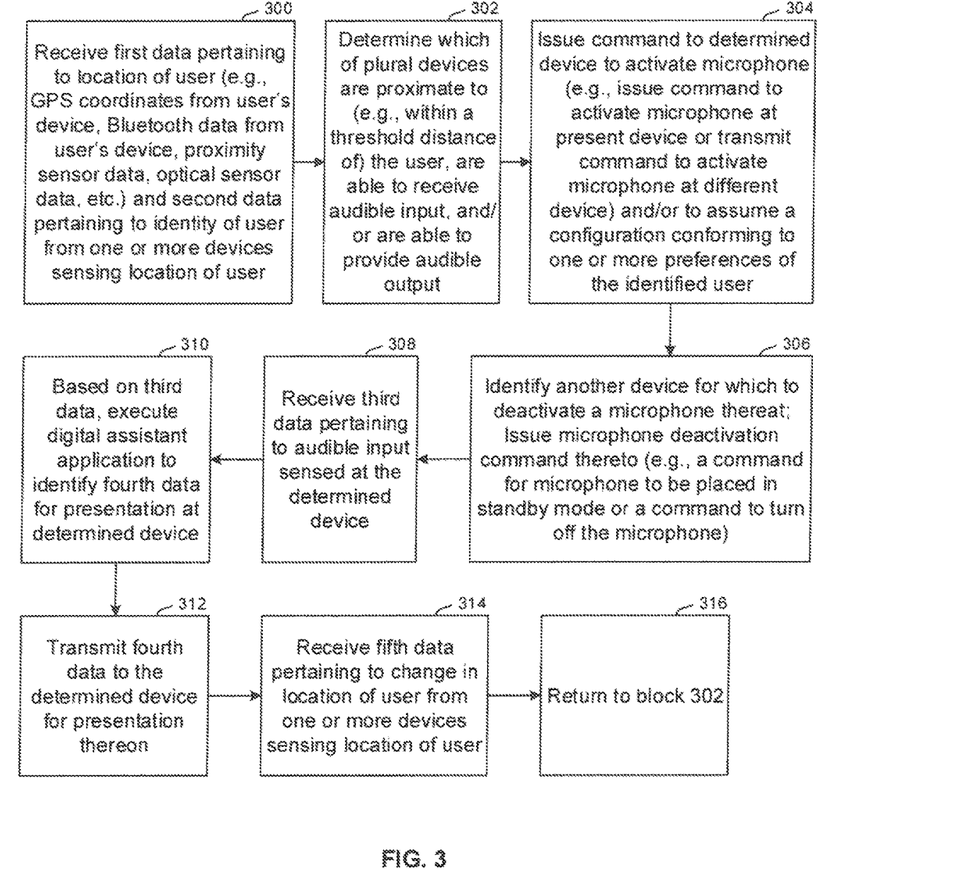
FIGS. 3 and 4 are flow charts of example algorithms in accordance with present principles.

Referring to FIG. 3, it shows example logic that may be executed by a device such as the system 100 (referred to when describing FIG. 3 as the "present device") for identifying one or more devices for which to activate a microphone so that audible input may be received at the one or more devices, and/or for which to activate a speaker so that audio may be presented at the one or more devices, in accordance with present principles. The logic of FIG. 3 may be executed by any of the devices described herein, such as a device and/or server coordinating with other devices to process audible input and provide audible output based on the audible input, any user's personal device, a network-connected device such as a Bluetooth speaker, etc.

Beginning at block 300, the logic may receive first data from another device in communication with the present device, where the first data may be data pertaining to a location of a user, one or both of an absolute location or a location relative to the other device. The present device and/or other device may do so by identifying the presence of a user at a particular known location within an area shown in an image from a digital camera, or another optical sensor such as an infrared (IR) optical sensor, on the other device. Spatial analysis may also be performed on the image to identify a location of the user relative to known locations of other objects in the image and/or relative to the device gathering the image(s). In addition to or in lieu of the foregoing, images taken at different times, such as one or two seconds apart, may be compared (e.g., sometimes referred to as full image sensing) to identify a new presence of the user at a given location in a later-taken image compared to an earlier-taken image. Thus, it is to be understood that the first data that is received may include an indication of the location itself, and/or data gathered by the sensor on the other device to then identify the location at the present device.

Additionally or alternatively, input from a proximity sensor other than an optical sensor may be used to identify an absolute location or one relative to the other device, such as input from a laser rangefinder, a radar transceiver, an ultrasonic or other sound transceiver (such as to identify a location of the user based on echolocation), etc.

Still further, the location of the user may be identified by identifying a location of the user's personal device (such as a smart phone or tablet associated with the user) and assuming that the user is at or adjacent to his or her personal device. Thus, GPS coordinates from the user's personal device may be received from the personal device for determining location.

A received signal strength indication (RSSI) algorithm may also be executed based on signals from the user's personal device. For example, RSSI may be used where signals from a Wi-Fi or Bluetooth transceiver on the user's personal device is received at various Wi-Fi or Bluetooth access points having known locations within a given area, and then used to determine a strength of signals from the user's personal device at the various Wi-Fi or Bluetooth access points to determine a distance of the personal device from each of the various access points and then a location of the personal device relative to the various access points. As another example, a distance to the user may be identified based on execution an RSSI algorithm on signals from the user's personal device to determine user proximity. Signal time of flight principles and algorithms, signal angle of arrival principles and algorithms, trilateration principles and algorithms (such as when the location of access points are known), and/or triangulation principles and algorithms may also be used to identify a location of the user's personal device, and hence the user, based on signals from that user's personal device.

Also at block 300, the logic may receive second data pertaining to the identity of the user himself or herself from one or more devices sensing the user. The second data that is received may indicate the identity of the user, and/or may be data gathered by a sensor on another device which may then be used to identify the user at the present device.

Providing some examples, the user may be identified based on received images of a field of view including the user such as may have been gathered by another device in communication with the present device (such as the user's personal device or a Bluetooth speaker having a camera) and/or taken using a camera or other optical imager on the present device itself. The logic may then execute facial and/or object recognition algorithms using the images to identify the user.

The logic may also identify the user by identifying a personal device associated with the user and assuming the user is adjacent to or possessing the personal device. The logic may identify the personal device by executing object recognition on an image from a camera to identify the personal device from an image, based on the personal device communicating over a network to which the present device has access, based on the personal device communicating GPS coordinates and metadata indicating a specific device from which the GPS coordinates were transmitted, etc.

Still other ways of identifying the user at block 300 may be used, such as using voice recognition to identify the voice of the user based on input from a microphone that senses the user's voice. Other types of biometric identification may be used as well, such as fingerprint identification or retina identification.

From block 300 the logic may proceed to block 302, where in response to receipt of the first data and/or second data the logic may determine which one of plural networked devices and/or apparatuses arrayed within a given area, building, space, etc. are proximate to the user based on the first data received at block 300 pertaining to the location of the user. This device apparatus that is determined from among the plural networked devices will be referenced below as "the apparatus" for simplicity. The logic may determine or identify this apparatus, for instance, by comparing an identified location of the user to known locations of the networked devices to determine which networked device is closest to the location of the user, and then selecting the closest one as the apparatus. Furthermore, in some embodiments the logic may determine or identify this apparatus by determining which of the plural networked devices are both proximate to the user and are able to one or both of receive audible input (such as which have a microphone thereon) and provide audible output (such as which have a speaker thereon), and then selecting the apparatus satisfying those criteria.

A networked device may be a device communicating over an Internet of things network to which the present device is connected, a Wi-Fi network to which the present device is connected, a Bluetooth network to which the present device is connected, another peer-to-peer network to which the present device is connected, etc. Proximate to the user may be within a threshold distance of the user, may be that the device/apparatus is a most-proximate device to the user, and/or may be that the device/apparatus is a most-proximate device to the user that is able to receive audible input and/or that is able to provide audible output.

From block 302 the logic may proceed to block 304. At block 304 and in response to the determination at block 302 the logic may issue one or more commands to the apparatus to activate an audio device such as a microphone on the apparatus (e.g., power the microphone on) so that audible input (such as voice input) may be received thereat, and/or to activate an audio device such as a speaker on the apparatus (e.g., power the speaker on) so that audio may be presented thereat. Note that in some embodiments, the apparatus may be the present device (such as if the user happens to be nearest to the present device than to other networked devices), and hence the command may be issued by a processor of the present device to a microphone and/or speaker on the present device to respectively activate. In other embodiments, the apparatus may be another device in communication with the present device, and hence the command may be transmitted over a network to the apparatus for the apparatus to activate a microphone and/or a speaker at the apparatus.

Also at block 304, and assuming an identity of a user has been determined at block 300 as may be the case in some embodiments, the logic may issue one or more commands for the apparatus to assume one or more configurations conforming to one or more preferences of the user. User preferences may include a sensitivity level for the microphone on the apparatus, a volume level for audio output from the speaker on the apparatus, types of prompts and notifications to present at the apparatus, etc. User preferences may also include configuring the apparatus one way or another (such as at one volume output level or another) baaed on a time of day, a day, a number of people in a same area as the user, an identity of another person in the same area as the user, a distance between the user and the apparatus, a type of device currently possessed by the user, etc.

After block 304 the logic may move to block 306. At block 306 the logic may identify another one of the networked devices for which to deactivate a microphone thereat and/or to deactivate a speaker thereat. For identification of another device for which to deactivate a microphone, the other networked device may be identified based on communication with the other networked device to determine that its microphone is currently activated (e.g., powered on), and/or based on a determination that a command was previously issued to activate the microphone but that another command was not subsequently issued to deactivate the microphone. For identification of another device for which to deactivate a speaker, the other networked device may be identified based on communication with the other networked device to determine that its speaker is currently activated (e.g., powered on), and/or based on a determination that a command was previously issued to activate the speaker but that another command was not subsequently issued to deactivate the speaker.

Additionally or alternatively, the other networked device may be identified at block 306 based on a determination that the other networked device is not currently proximate to the user and/or is no longer proximate to the user, which may be the case if it was proximate to the user (and hence the microphone and/or speaker activated) prior to the user moving to another location at which the user is assumed to be at currently as may be determined at block 300.

Also at block 306, the logic may issue a command to deactivate the microphone and/or speaker at the other networked device identified at this block. For instance, the command may be a command to place the microphone in a standby mode and/or state, and/or to place the speaker in a standby mode and/or state. The command may also be a command to turn the microphone off and/or cease providing power thereto, and/or to turn the speaker off and/or cease providing power thereto.

Much of the following description of FIG. 3 (e.g., blocks 308-312) will be described assuming that audible input is to be received at a microphone on the apparatus in accordance with present principles, but it is to be nonetheless understood that once a speaker has been activated at the apparatus based on the command issued at block 304, the apparatus may be in a configuration in which audio is presentable and thus in which audio may then be presented at the apparatus in accordance with present principles and at an appropriate time, such as responsive to receipt of data pertaining to a notification that is to be presented audibly at the apparatus or responsive to a command to output music at a most-proximate device to a user.

From block 306, the logic of FIG. 3 may then continue to block 308. At block 308 the logic may receive third data from the apparatus, as may have been detected by the activated microphone at the apparatus or another sensor at the apparatus through which audible input is receivable. The third data may pertain to audible input sensed at the apparatus, such as a verbal command to the apparatus and/or present device to perform a search for certain information, a verbal command to convey certain information to the user, a verbal command to control a device or apparatus within the network such as to turn a smart lamp on, a verbal command to set a reminder in an electronic calendar associated with the user, a verbal command to control a smart television or set top box within the network to tune to a particular channel, etc.

Then at block 310, in response to receipt of the third data, the logic may execute a digital and/or electronic assistant application to identify fourth data (based on the third data) for presentation at the apparatus, and/or may execute the digital assistant application to otherwise perform a function to comply with the audible input/command. The digital assistant application may be a so-called personal assistant application, an audible input processing application, and/or an application such as Apple's Siri application, Google's voice command application, Amazon's Echo application, etc.

The logic may then move to block 312 where, responsive to identifying the fourth data, the logic may transmit the fourth data to the apparatus (such as for presentation to the user using the apparatus) or otherwise perform a function to comply with the audible input.

Thereafter, the logic may move to block 314 where the logic may receive fifth data pertaining to a new location of the user and/or a change in location of the user from one or more devices sensing the new/changed location. The new/changed location may be identified similarly to how the location discussed above was identified as disclosed at block 300.

From block 314, the logic may then move to block 316 responsive to receipt of the fifth data, where the logic may return to block 302 and proceed therefrom using the fifth data, such as determining which of the plural networked devices are now proximate to the user at the new/changed location and activating a microphone or speaker at the newly determined proximate device. The previously determined proximate device may also be commanded to deactivate its microphone and/or speaker owing to the user no longer being proximate to it.

Figure 4:
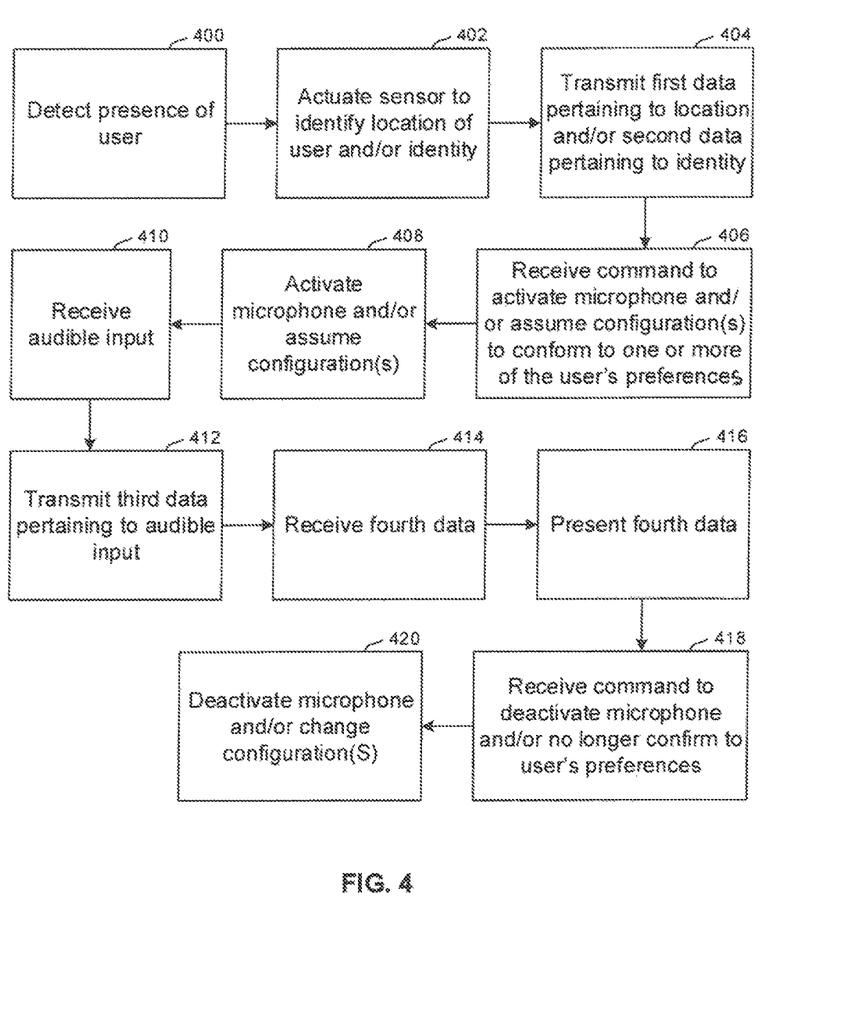

FIG. 4 shows example logic that may be executed by a device in accordance with present principles, such as the apparatus referenced above when describing FIG. 3, which will now be referenced below as a "presence-sensing device". The presence-sensing device may include some or all of the components described above in reference to the system 100.

Furthermore, it is to be understood that the logic of FIG. 4 may be executed by any of the devices described herein, but will be described below assuming that the presence-sensing device executing the logic of FIG. 4 is separate from a device executing the logic of FIG. 3. Notwithstanding, it is to be understood that the device of FIG. 3 may in some instances also execute the logic of FIG. 4, such as when that device is determined to be a most-proximate device to a user as disclosed herein. Even further, it is to be understood that more than one device at more than one location may provide data for determining a location of a user in accordance with present principles FIG. 4 begins at block 400, where the logic detects the presence of a user. The logic may do so based on input from a presence sensor, proximity sensor, camera, etc., such as one at the presence-sensing device that monitors the surroundings of the presence-sensing device. The logic may then, responsive to detecting the presence of the user and/or receiving input from the sensor, proceed to block 402 where the logic may actuate the sensor to receive input therefrom pertaining to a location and/or identify of a user, and/or may actually identify the location and/or identity of a user based on the input from the sensor, as described herein. Then at block 404 the logic may transmit to a coordinating device first data pertaining to the location of the user and/or second data pertaining to the identity of the user, such as the data from the sensor, and/or data indicating the location and identity themselves as identified at the presence-sensing device.

From block 404 the logic may move to block 406 where the logic may receive a command from the coordinating device to activate a microphone at the presence-sensing device and/or a speaker at the presence-sensing device, and/or for the presence-sensing device to assume one or more configurations to conform to one or more preferences of a user as described herein. The logic may then move to block 408 where the logic may activate the microphone and/or speaker in response to receipt of the command at block 406. Also at block 408, the logic may assume one or more configurations in conformance with one or more user preferences if one or more commands to do so were also received at block 406.

From block 408 the logic may proceed to block 410 where the logic may, via the microphone, receive audible input from a user. Responsive to receiving the audible input, the logic may then move to block 412 where the logic may transmit third data to the coordinating device pertaining to the audible input, such as data indicating the content of the audible input and/or data of the audible input itself. The logic may then move to block 414 where the logic may receive fourth data back from the coordinating device, and then at block 416 responsive to receiving the fourth data the logic may present the fourth data at the presence-sensing device. In some examples, the fourth data may be an answer to a query posed by the user through the audible input received at block 410.

It is to be understood that while the previous few steps in the logic of FIG. 4 were described in reference to audible input, in some embodiments the logic may activate a speaker at block 408 and then move directly to block 414 where the logic may receive data pertaining to audio to be presented at the presence-sensing device, which may then cause the logic to then proceed to block 416 and present the audio.

In any case, the logic of FIG. 4 may then move from block 416 to block 418. At block 418 the logic may receive a command to deactivate the microphone and/or the speaker on the presence-sensing device, and/or to no longer conform to one or more user preferences for which one or more configurations were assumed at block 408. The logic may then conclude at block 420 where the logic may, in response to receiving the command(s) at block 418, deactivate the microphone, deactivate the speaker, and/or otherwise change configurations accordingly.

Continuing the detailed description in reference to FIG. 5, it shows an example user interface (UI) 500 that may be presented on a display of a device for configuring settings of that device (such as a coordinating device) and/or other devices within its communication network in accordance with present principles (collectively referred to as the "coordinating device" below for simplicity). The UI 500 may include a first option 502 for the coordinating device to activate microphones and/or speakers within the communication network based on a location of a user as described herein. The option 502 may be enabled using the respective check box selector shown adjacent thereto.

The UI 500 may also include a second option 504 for the coordinating device to activate microphones and/or speakers within the communication network based on user identity, such as if microphones or speakers are to be activated for some users but not others, as may be determined based on input of user preference. The option 504 may be enabled using the respective check box selector shown adjacent thereto.

Figure 5:
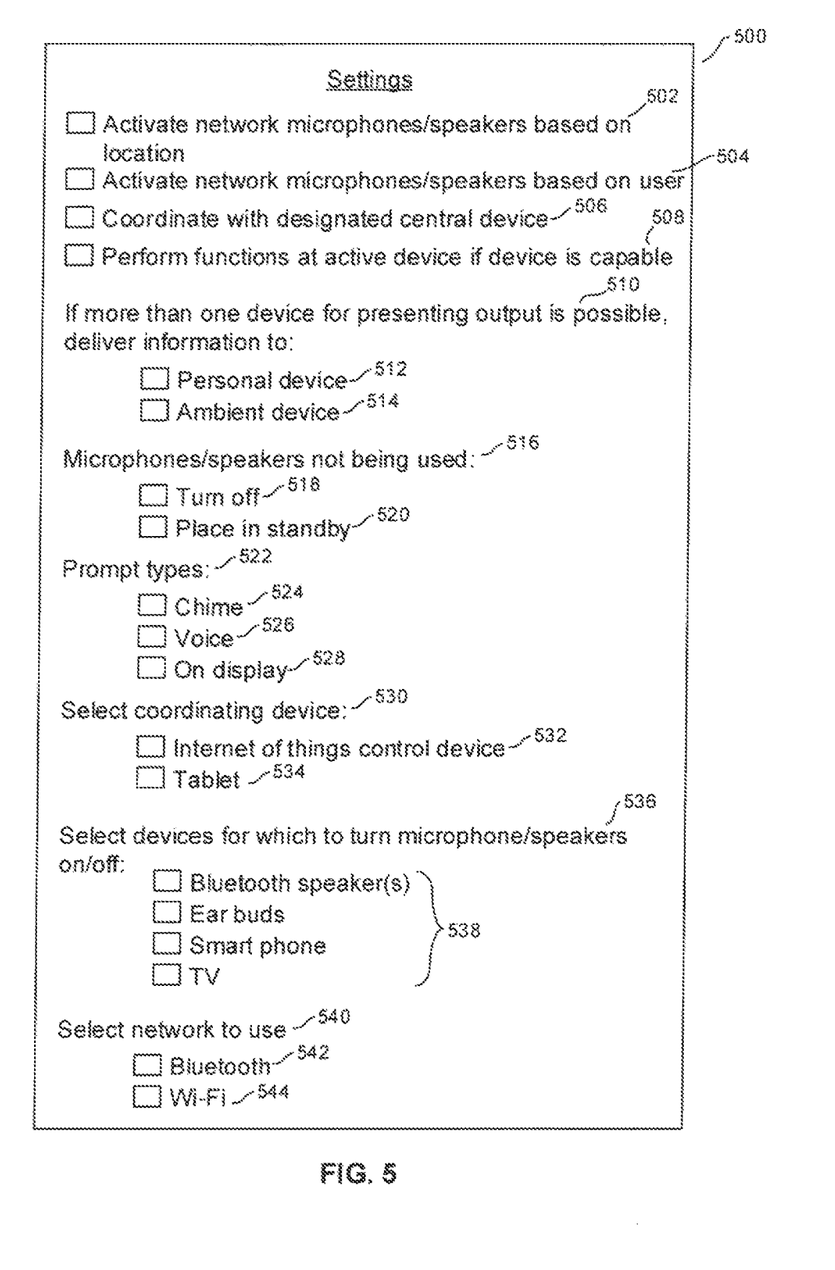
FIGS. 5 and 6 are example user interfaces (UIs) in accordance with present principles.

FIG. 5 also shows an option 506 for a device to coordinate with a designated (e.g., user-designated) central device and/or coordinating device in accordance with present principles. Thus, it is to be understood that option 506 may be presented for configuring devices other than the coordinating device itself. The option 506 may be enabled using the respective check box selector shown adjacent thereto. Also shown on the UI 500 is another option 508 that may also be presented for configuring a device other than the coordinating device itself. The option 508 may be enabled based on selection of the respective check box selector shown adjacent thereto for the device being configured to perform various functions at it based on audible input detected by its microphone if the device is capable of doing so, rather than transmitting audible input data to a coordinating device as disclosed above and then receiving back other data to then be presented at that device. Thus, for instance, such a device would be able to execute a digital assistant application thereat to process audible input and render an output in response.

The UI 500 may also include a setting 510 to configure the coordinating device to present output (such as music, or output in response to audible input from a user) based on a user preference for presenting the output at a personal device associated with the user (option 512, selectable using the respective check box selector shown adjacent thereto) or at an ambient device (option 514, selectable using the respective check box selector shown adjacent thereto). A personal device may be a smart device and/or communication-enabled device associated with the user and/or that the user may have on their person, such as a wearable device, a smart phone, smart headphones, etc. An ambient device may be a device typically disposed within a room that a user may not transport or move on a day to day basis, such as a smart television, a Bluetooth speaker, a coordinating device mounted on a wall for controlling other devices within an Internet of things environment, etc. In some examples, a personal device may be determined as such in a given instance based on input from a contact sensor on that device sensing contact with a person, and conversely an ambient device may be determined as such in a given instance based on input from a contact sensor on that device indicating a lack of contact with a person.

Still further, the UI 500 may include a setting 516 to configure microphones and/or speakers that are identified for deactivation as disclosed herein to either be turned off (option 518, selectable using the respective check box selector shown adjacent thereto) or to be placed into a standby mode (option 520, selectable using the respective check box selector shown adjacent thereto).

The UI 500 also shows a setting 522 for selecting one or more types of prompts to present. Thus, a first prompt type 524 may be to present prompts as chimes or tones, and may be selectable using the respective check box selector shown adjacent thereto. A second prompt type 526 may be to present prompts using an automated or computerized voice, and may be selectable using the respective check box selector shown adjacent thereto. A third prompt type 528 may be to present prompts on a display (such as a display determined to be most-proximate to the user), and may be selectable using the respective check box selector shown adjacent thereto. As examples, a prompt may be presented to indicate that the device is ready to accept audible input, that the device was unable to detect audible input, and/or that audible input was unintelligible. In some embodiments, a voice prompt or prompt presented on a display may be even used to convey information determined in response to audible input.

FIG. 5 also shows that the UI 500 may include a setting 530 for a user to select or designate a particular device from among plural able devices to be a coordinating device in accordance with present principles. Thus, a first example option 532 is shown for a user to select an Internet of things control device as the coordinating device using the respective check box selector shown adjacent thereto. A second example option 534 is also shown for a user to select a particular tablet computer as the coordinating device using the respective check box selector shown adjacent thereto.

Moreover, in some embodiments the UI 500 may include another setting 536 for a user to select one or more devices for which a microphone and/or a speaker thereon is to be activated and deactivated as disclosed herein. Example options 538 associated with various devices communicating over a network are shown for respective selection to activate and deactivate their respective microphones and/or speakers as described herein, with each one being selectable using the respective check box shown adjacent thereto. Additionally, though not shown on the face of FIG. 5, it is to be understood that in some examples, settings may be presented for a user to select one or more devices for which to never activate and deactivate a microphone and/or speaker of that particular device as described herein (and hence, for example, always remain deactivated) and for a user to select one or more devices for which to always have their respective microphones and/or speakers remain activated regardless of user location and/or identity as disclosed herein. Even further, in some examples, one or more depressible buttons and/or touch-sensitive buttons may be disposed on various devices for a given a network and may be selected to select that respective device as a device for which microphones and/or speakers are to be activated and deactivated, and/or may be selected for a one-time activation of a microphone and/or speaker at that respective device so that a user may provide audible input thereto.

Still in reference to FIG. 5, in some examples, the UI 500 may include a setting 540 for a user to select one or more networks over which various devices have already been configured to communicate with each other to specifically communicate over them to transmit data and commands as described above in reference to FIGS. 3 and 4, and/or to otherwise receive and process audible input and/or present audio. A first example option 542 is shown for a user to select a Bluetooth network using the respective check box selector shown adjacent thereto. A second example option 544 is also shown for a user to select a Wi-Fi network using the respective check box selector shown adjacent thereto.

Figure 6:
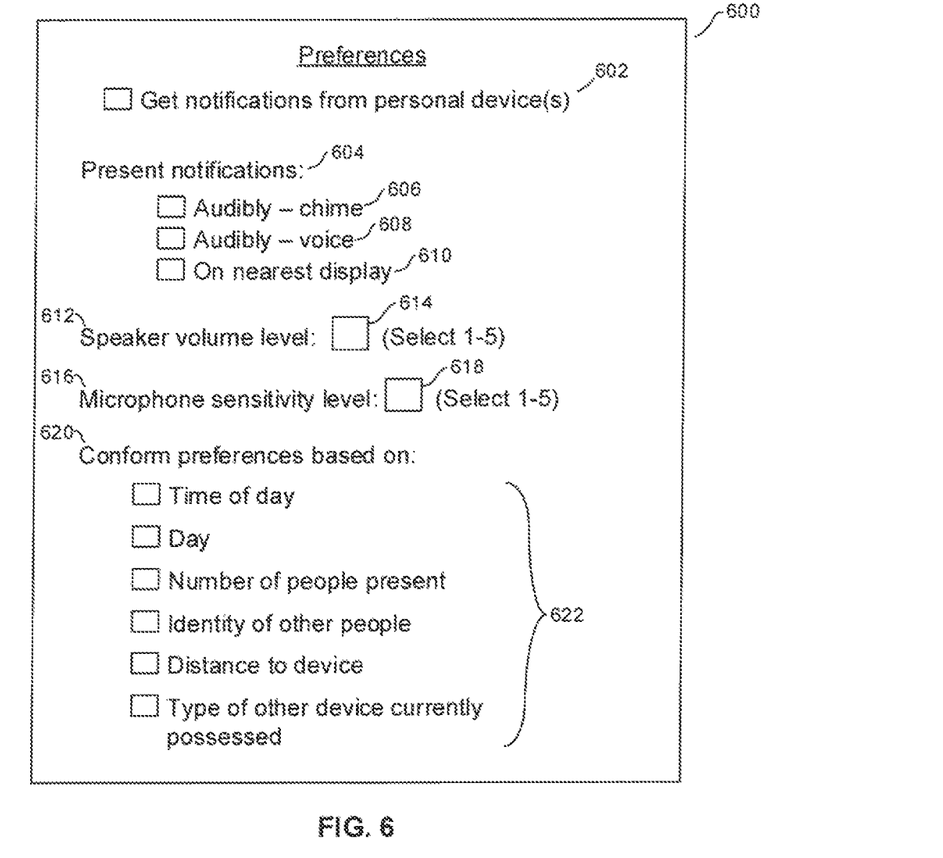

Before moving on to the description of FIG. 6, it is to be understood in reference to the settings UI 500 of FIG. 5 that such a settings UI may include still other settings for configuration as well. For example, settings may be presented for a person to select various ways to identify user locations and/or identity, such as using RSSI, using images from a camera, using facial recognition, using an IR proximity sensor, etc.

Now describing FIG. 6, it shows an example UI 600 that may be presented on a display of a device for configuring user preferences for which devices are to conform in accordance with present principles. It is to be understood that preferences shown on the UI 600 may be configured on a per-device basis (such as for each device to be used in accordance with present principles) and/or per-user basis (such as for each user for which microphones and/or speakers are to be activated and deactivated in accordance with present principles).

A first option 602 is shown on the UI 600 for configuration of notifications from a personal device, such as text message notifications, email notifications, and incoming call notifications from a given user's smart phone, to be presented at a device determined to be proximate to a user as described herein. In addition to or in lieu of the foregoing, the option 602 may be for configuration of the content of the text messages, emails and calls themselves to be presented at the device determined to be proximate to a user as described herein.

The UI 600 may also include a setting 604 to present such notifications using one or more various notification types. Thus, an option 606 may be presented to select chimes or tones to be used for presenting notifications by selecting the respective check box selector shown adjacent to option 606. An option 608 may be presented to select an automated or computerized voice to be used for presenting notifications by selecting the respective check box selector shown adjacent to option 608. An option 610 may be presented to select a most-proximate display to a user in a given instance to be used for presenting notifications by selecting the respective check box selector shown adjacent to option 608.

The UI 600 may also include an option 612 for a user to specify a volume level using input box 614 for audio output from one or more speakers. In the example shown, a volume level on a scale from one to five may be selected. The UI 600 may further include an option 616 for a user to specify a microphone sensitivity level using input box 618 for detecting audible input from a user. In the example shown, a microphone sensitivity level on a scale from one to five may be selected.

The UI 600 may also include a setting 620 for a user to select various parameters for times and conditions under which a device is to conform to user preferences. Thus, example options 622 respectively associated with such parameters are shown and may include time of day, day (of the week, of the month, of the year, etc.), a number of people present in the room (such as only conforming to preferences when only one user is in the room), the identity of other people (such as conforming to preferences each of plural users respectively at most-proximate devices to each of the users), a distance from a user to a given device at which output is to be presented (such as conforming to various volume levels that vary based on distance as specified by a user), and a type of device currently possessed (such as conforming to a first volume level when a personal device such as smart ear buds are to present output and conforming to a second volume level when an ambient device such as a Bluetooth speaker is to be used). Each respective option 622 may be selectable using the respective check box selector shown adjacent thereto.

In accordance with present principles, it is to be understood that should two users be present within a given area but be proximate to different devices, each one of those devices may receive different audible input and/or provide different audio output, even at the same time as each other.

Furthermore, in some embodiments microphones of devices undertaking present principles may even be able to sense audio input from a user on another side of a wall from the device.

Providing a few examples in accordance with present principles, suppose but one user is present in a given area among plural ambient devices. It may be determined by a system undertaking present principles that the user is closer to audio input/output (I/O) device A than to audio I/O device B. As a result, the microphone on audio I/O device A may be turned on and be ready to listen while the microphone on audio I/O device B may be in a standby state, such as to preserve power that would otherwise be consumed by it and/or to provide increased privacy at its location owing to the microphone not being enabled for sensing audible input. Furthermore, if it is determined by the system that the user moves away from device A and toward device B, the system can turn on the microphone for device B and place in standby the microphone for device A.

As another example, suppose that plural users are present within a given area and that plural ambient devices are also present in the area. A system undertaking present principles may determine that a first user is near audio I/O device A and a second user is near audio I/O device B. As a result, the system may ensure that each of audio I/O devices A and B are outputting audio (e.g., music) per the preference(s) of the respective user of the first and second users that is closest to that respective I/O device.

As but one more example, suppose a user is currently wearing ear buds or headphones or another wearable audio-providing device. That user may prefer for audio to be delivered to the ear buds instead of any ambient audio I/O devices statically positioned proximate to the user, and hence audio may be output at the ear buds rather than another proximate ambient device based on this user preference.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein.

What is claimed is:

1. A first device, comprising:
at least one processor; and
storage accessible to the at least one processor and bearing instructions executable by the at least one processor to:
receive information pertaining to a location of a user;
based at least in part on the information, determine an apparatus to actuate from among plural apparatuses to participate in communication concerning audio data;
based at least in part on the determination, participate in communication with the apparatus concerning audio data; and
present a user interface (UI) on a display, the UI comprising an option that is selectable to enable the first device to, based on information pertaining to user location, determine devices to actuate for the devices to participate in communication concerning audio data.

2. The first device of claim 1, wherein the instructions are executable by the at least one processor to:
issue a command to the apparatus to assume a configuration for participation in the communication concerning the audio data.

3. The first device of claim 1, wherein the first device is determined to be the apparatus, and wherein the first device further comprises a microphone and a speaker.

4. The first device of claim 1, wherein the instructions are executable by the at least one processor to:
based at least in part on the information, determine an apparatus to actuate from among plural apparatuses to receive audible input; and
based at least in part on the determination, issue a command for the apparatus to assume a configuration in which audible input is receivable.

5. The first device of claim 4, wherein the configuration in which audible input is receivable comprises a configuration in which a microphone is powered on.

6. The first device of claim 1, wherein the instructions are executable by the at least one processor to:
based at least in part on the information, determine an apparatus to actuate from among plural apparatuses to present audio; and
based at least in part on the determination, issue a command for the apparatus to assume a configuration in which audio is presentable.

7. The first device of claim 6, wherein the configuration in which audio is presentable comprises a configuration in which a speaker is powered on.

8. The first device of claim 6, wherein the determination of the apparatus to actuate comprises a determination, based at least in part on the information, that the apparatus is a most-proximate device to the user at which audio is presentable.

9. The first device of claim 1, wherein the determination of the apparatus to actuate comprises a determination, based at least in part on the information, that the apparatus is proximate to the user.

10. The first device of claim 9, wherein proximate to the user is within a threshold distance of the user.

11. The first device of claim 1, wherein the instructions are executable by the at least one processor to:
present, on the UI, a setting at which one or more devices may be selected for participation, based on user location, in communication concerning audio data.

12. The first device of claim 1, wherein the setting is a first setting, and wherein the instructions are executable by the at least one processor to:
present, on the UI, a second setting at which one or more devices may be selected for not participating, based on user location, in communication concerning audio data.

13. The first device of claim 1, wherein the instructions are executable by the at least one processor to:
receive information pertaining to an identity of the user;
issue a command to the apparatus to assume a configuration in conformance with at least one preference of the user, the at least one preference identified based at least in part on the information pertaining to the identity of the user.

14. The first device of claim 13, wherein the at least one preference comprises a preference regarding one or more of: a type of prompt to present at the apparatus, and a type of notification to present at the apparatus.

15. The first device of claim 13, wherein the at least one preference comprises a preference regarding a microphone sensitivity level.

16. A method, comprising:
receiving information at a device pertaining to a location of a user;
determining, based at least in part on the information, an apparatus to actuate from among plural apparatuses to participate in communication with using the device and concerning audio data;
using, based at least in part on the determination, the device to participate in communication with the apparatus concerning audio data; and
presenting a user interface (UI) on a display, the UI comprising an option that is selectable to enable the device to, based on information pertaining to user location, determine apparatuses to actuate for the apparatuses to participate in communication with the device concerning audio data.

17. The method of claim 16, wherein the method comprises:
providing a command for the apparatus to activate an audio device on the apparatus.

18. The method of claim 16, comprising:
presenting, on the UI, a setting at which one or more apparatuses may be selected for participation, based on user location, in communication with the device concerning audio data.

19. A computer readable storage medium that is not a transitory signal, the computer readable storage medium comprising instructions executable by at least one processor to:
receive first data pertaining to a location of a user;
based on the first data, identify a device at which to present audio;
provide audio data to the device based on the identification of the device;
present a user interface (UI) on a display, the UI comprising an option that is selectable to enable the at least one processor to, based on information pertaining to user location, determine devices to actuate for the devices to participate in communication concerning audio data.

20. The computer readable storage medium of claim 19, wherein the instructions are executable by the at least one processor to:
provide a command for the device to activate a microphone on the device;

receive, from the device, second data pertaining to audible input received via the microphone;

in response to receipt of the second data, execute a digital assistant application to identify third data for audio presentation at the device; and transmit the third data to the device.

\* \* \* \* \*